UNITED STATES PATENT OFFICE.

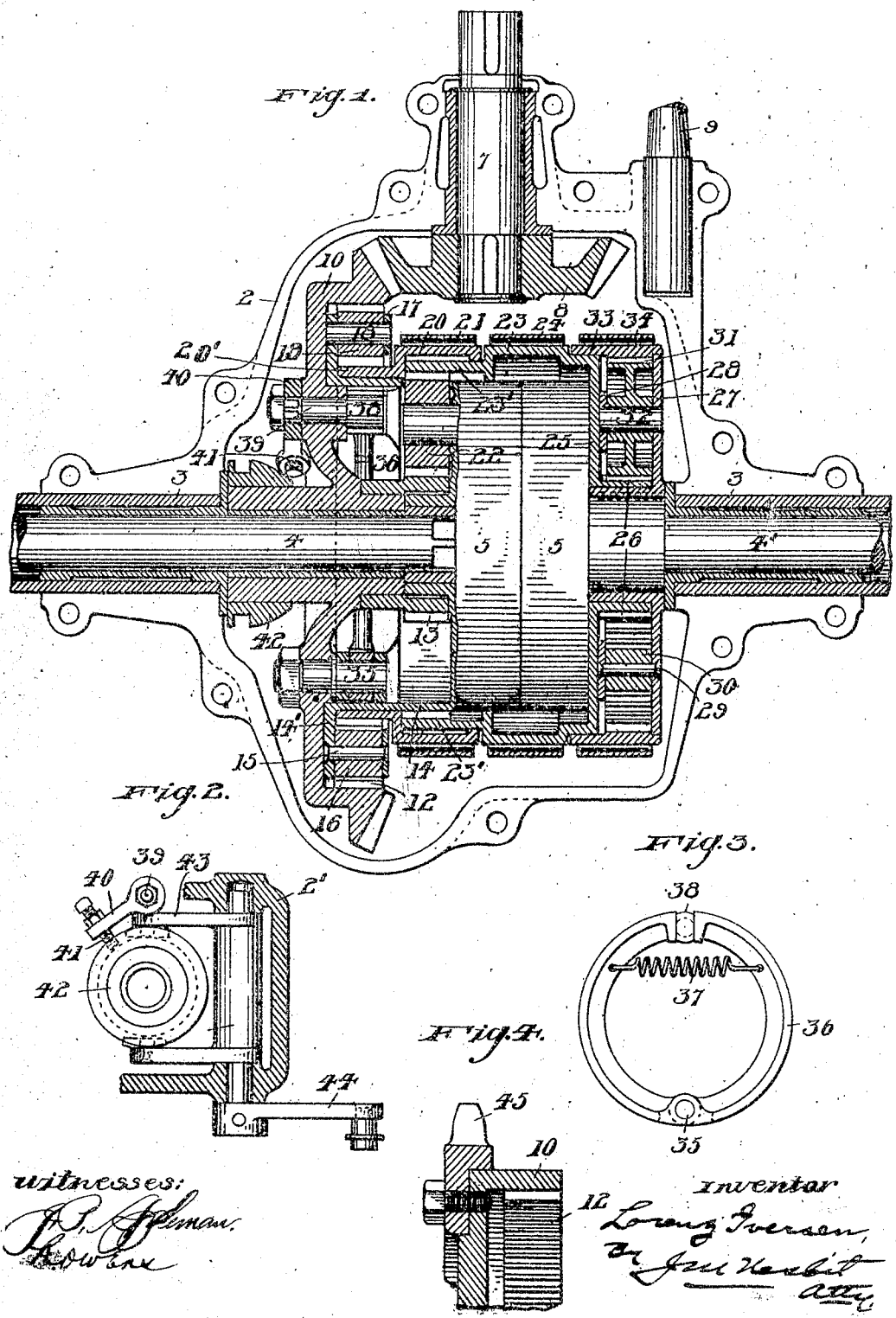

LORENZ IVERSEN, OF PITTSBURG, PENNSYLVANIA.

DRIVING-GEAR FOR MOTOR-CARS, &c.

No. 856,703.

Specification of Letters Patent.

Patented June 11, 1907.

Application filed March 25, 1907. Serial No. 364,444.

*To all whom it may concern:*

Be it known that I, LORENZ IVERSEN, a resident of Pittsburg, in the county of Allegheny and State of Pennsylvania, have invented certain new and useful Improvements in Driving-Gears for Motor-Cars and Other Services, of which the following is a specification.

One object of this invention is to provide a speed-changing gear of the planetary type for motor cars and other services, having more speed variations than are ordinarily obtainable from gears of this type.

A further object is to arrange the mechanism in compact form, and to so assemble it with relation to the differential or balance gears that all may be mounted on the axle or other driven shaft and be inclosed in a casing arranged at the juncture of the driving and driven members.

In the accompanying drawings, Figure 1 is a sectional plan view of the improved mechanism, one section of the inclosing casing having been removed. Fig. 2 is a detail view of the clutch operating mechanism, and Fig. 3 is a similar view of the clutch shoes. Fig. 4 is a detail view of a modified form of drive.

As the invention is here illustrated adapted for motor car use, I have shown a casing 2 mounted on the tubular sleeve 3 which incloses the sections 4 and 4' of the rear axle of a car. 5 is the casing which incloses the differential gearing, the latter operating axle parts 4 and 4'. The gearing within this casing is of familiar construction and is not illustrated in detail as it forms no part of the invention. As is well known, the differential or balance gearing is employed to permit the ground wheels to rotate at different speeds, as when turning corners, reversing the position of the car, etc.

7 is the drive shaft carrying driving pinion 8, which shaft may be connected to the motor mechanism in any suitable manner. A portion of a brace, stay, or truss 9 is shown, which may extend from frame 2 to some other part of the car frame for holding frame 2 rigid.

Rotatable on axle 4 is the main driven wheel 10, having its inwardly facing peripheral rim cogged and meshing with drive gear 8, the rim being also geared internally, as indicated at 12. Secured to the inner portion of the hub of driven wheel 10 is the cogged gear 13. Thus, internal cogs 12 and the external cogged gear 13 comprise the cogged elements of the main driven wheel, which elements are in different planes, gear 13 being the nearer to casing 5. Casing 5 carries the latterly projecting annular flange 14 which extends into wheel 10, traversing the planes of cogged surfaces 12 and 13. The extremity of flange 14 is turned outwardly at 14' to form a rim, to which is secured by rivets 15 and spacing sleeves 16 the ring 17, and journaled between this ring and the rim on spindles 18 are the planetary gears 19 which mesh with internal cogs 12 of wheel 10.

20 is a brake wheel and 21 the brake band thereof, which may be operated in any convenient manner. Wheel 20 is formed with a lateral offset 20' which extends between rim 14 and gears 19 and is cogged exteriorly to mesh with the latter.

Journaled on casing 5 in the plane of and meshing with the externally geared surface 13 of wheel 10 are planetary gears 22, which extend through openings in flange 14 and mesh with the internally cogged part 23' of brake wheel 23, said cogged part being within brake wheel 20 and forming a bearing therefor. Thus, brake wheels 20 and 23 are arranged most compactly with their braking surfaces side by side. 24 is the brake band for wheel 23. Wheel 23 extends inward at 25 around gear casing 5 and is formed with the hub-like part 26, cogged externally as shown. Secured to casing 5 is disk 27.

28 is a ring secured to and spaced from the inner face of disk 27 by rivets 29 and thimbles 30. Journaled between disk 27 and ring 28 are the differential gears 31, each mounted on a spindle 32. Gears 31 mesh with part 26 of wheel 23, also with the internal cogs on brake wheel 33, the latter surrounding disk 27 and partially overlapping the larger diameter of wheel 23. 34 is the brake band for wheel 33.

Pivoted at 35 to the inner face of main driven wheel 10 are the semi-circular brake shoes 36 which are adapted to engage the inner face of casing flange 14. The shoes are held normally drawn inward and out of clutching engagement by spring 37. Between the free ends of the shoes is eccentric 38 carried by stem 39. The latter is rotatably secured to wheel 10, and at its outer end carries arm 40. A set screw 41 on this arm, which regulates its throw, is adapted to be engaged by the shifting cone 42, and by this means eccentric 38 is turned for spreading shoes 36 and clutching flange 14, thereby rigidly uniting the main driven wheel 10 and gear casing 5. Cone 42 may be operated by the oscillating fork 43 mounted in a suitable part 2' of the casing, with an arm 44 connected to the fork stem to which an actuating rod may be secured.

The operation is as follows: For the first or highest speed, the clutch mechanism is operated as above described to rigidly connect the main driven wheel 10 with the gear casing, thus making direct connection with the driving pinion 8. For the second highest speed, the clutch is released and brake wheel 20 is held from rotating by its brake band 21. Cogged part 20' of wheel 20 then becomes a fixed surface which must be traversed by the planetary gears 19, the latter being actuated by the internal cogs 12 of the main driven wheel 10. Gears 19 carry with them and rotate flange 14 and the differential gear casing, and thus transmit to the shaft a slower speed than when it and the wheel 10 are directly connected by the clutch mechanism. For the third or low speed, brake band 21 is released and brake band 24 tightened, thereby holding brake wheel 23 from rotating. This brings differential gears 22 into play, parts 23' of brake wheel 23 being the fixed cog element which said gears must traverse, and cogs 13 of main driven gear 10 the driven element. Thus, the mechanism is driven at a slower speed than when differential gears 19 are active. For reversing the driven mechanism, brake bands 21 and 24 are slackened, as is also the clutch mechanism, and brake band 34 is tightened which holds brake wheel 33 from rotating. This last mentioned wheel then becomes the fixed cogged surface which is traversed by the differential gears 31, and the geared portion 26 of brake wheel 23 becomes the movable or driven element, the motion being transmitted through said wheel 23, and gears 22 to the cogged element 13 of the main driven wheel 10, with the result that the latter is driven in the reverse direction at a relatively low speed.

Each of the three sets of planetary gears here shown consists preferably of three gear wheels arranged at equal distances apart, and the same is true of spacing elements 15, and 16, 29 and 30 of rings 17 and 28, respectively.

By constructing and assembling the parts as here shown, the brake wheels and bands for controlling the mechanism are arranged in close proximity to each other and side by side, thus adding materially to the compactness of the mechanism, all of which may be conveniently assembled and rendered operative in a comparatively small space. Instead of actuating the main driven pinion by a bevel gear, it may be provided with sprocket teeth 45, Fig. 4, to receive a drive chain.

While the invention is here shown and described in connection with motor car use, it is not confined thereto.

I claim:—

1. The combination of a main driven wheel having a cogged surface, a driven shaft, a set of planetary gears carried by the latter and meshing with the cogged surface of the driven wheel, a brake wheel having a cogged surface in mesh with the planetary gears, means for rigidly connecting the main driven wheel and the driven shaft, and brake-wheel holding means.

2. The combination of a main driven wheel having two cogged surfaces, a driven shaft, two sets of planetary gears rotatable therewith—one for each of the cogged surfaces of the driven wheel, cogged brake wheels—one in mesh with each set of planetary gears, and brake-wheel holding means.

3. The combination of a main driven wheel having cogged surfaces, a driven shaft, sets of planetary gears carried by the shaft—one set in mesh with each of said surfaces, overlapping brake wheels having their braking surfaces arranged side by side, each brake wheel having a cogged surface in mesh with a set of said planetary gears, and brake-wheel holding means.

4. The combination of a main driven wheel having an internally cogged surface, a driven shaft extending through said wheel, a casing mounted on the driven shaft, an annular projection on the casing concentric with the shaft and driven wheel and extending into the plane of the internal cogged surface of the latter, a set of planetary gears journaled on the annular projection and meshing with said internal cogged surface, clutch mechanism adapted to engage the projection for rigidly connecting it with the main driven wheel, a brake wheel having a cogged surface in mesh with the planetary gears, and brake-wheel holding means.

5. The combination of a main driven wheel having an internally cogged surface, a driven shaft extending through said wheel, a part mounted on the shaft having an annular extension projecting into the plane of said cogged surface, a set of planetary gears journaled on the said extension and meshing with said cogged surface, a brake wheel having a cogged surface interposed between said extension and the planetary gears and meshing with the latter, clutch mechanism carried by the main driven wheel and adapted to engage the interior of said extension, and brake-wheel holding means.

6. The combination of a main driven wheel having an internally cogged rim, a driven shaft extending through said wheel, a part mounted on the shaft, an annular flange projecting from said part into the driven wheel, a set of planetary gears on the exterior of the flange and journaled thereto and meshing with the cogged rim of the driven wheel, a brake wheel having a cogged surface interposed between said flange and the planetary gears and meshing with the latter, clutch mechanism carried by the main driven wheel and adapted to engage the interior of said flange, and brake-wheel holding means.

7. The combination of a main driven wheel having cogged surfaces of different diameters, a driven shaft extending through the wheel, a casing mounted on the shaft and having a flange, a set of planetary gears journaled on the flange and meshing with one of the cogged surface of said wheel, a brake wheel having a cogged surface meshing with said planetary gears, a second set of planetary gears journaled on said casing and meshing with the other cogged surface of the driven wheel, a brake wheel having a cogged surface in mesh with said second set of planetary gears, and brake-wheel holding means.

8. The combination of a main driven wheel having internally and externally cogged surfaces of different diameters and in different planes, a driven shaft extending through the wheel, a casing mounted on the shaft, a flange on the casing traversing the planes of said cogged surfaces, a set of planetary gears journaled on the flange and meshing with the internally cogged surface of the driven wheel, a brake wheel having a cogged surface interposed between said flange and the planetary gears and meshing with the latter, a second set of planetary gears journaled on said casing in the plane of said brake wheel and meshing with the interiorly cogged surface of the driven wheel, a second brake wheel having a cogged surface interposed between the first brake wheel and the second set of planetary gears and meshing with the latter, and clutch mechanism carried by the driven wheel and operative in the plane of the first mentioned set of planetary gears for engaging the casing flange, and brake-wheel holding means.

9. The combination of a main driven wheel having an externally cogged surface, a shaft extending through the wheel, a casing mounted on the shaft, a set of planetary gears journaled on the casing and meshing with the exteriorly cogged surface of the driven wheel, a wheel having external and internal cogged surfaces with the latter in mesh with said planetary gears, a gear carrier rotatable with the casing, a set of planetary gears journaled on the gear carrier and meshing with the exteriorly cogged surface of the last mentioned wheel, a brake wheel having an internal cogged surface in mesh with the last mentioned set of planetary gears, and brake-wheel holding means.

10. The combination of a main driven wheel having cogged surfaces, a driven shaft, a differential gear casing mounted on the shaft, two sets of planetary gears carried by the gear casing—one set for each of the cogged surfaces of the driven wheel, two combined brake wheels and gears—one for each set of planetary gears, mechanism for rigidly connecting the driven wheel and the said gear casing, and brake-wheel holding means.

11. The combination of a main driven wheel having cogged surfaces, a driven shaft, a differential gear casing mounted on the shaft, two sets of planetary gears carried by the gear casing—one for each cogged surface of the driven wheel, two combined brake wheels and gears—one of the brake wheels extending around the periphery of said gear casing and inward over one side of the latter and at said inwardly extending portion provided with a cogged surface, a set of differential gears meshing with said last mentioned cogged surface, a carrier rigid with the gear casing for the last mentioned set of differential gears, a brake wheel having a cogged surface for meshing with said last mentioned differential gears, and brake wheel holding means.

In testimony whereof I affix my signature in presence of two witnesses.

LORENZ IVERSEN.

Witnesses:
J. M. NESBIT,
JNO. J. FITZGERALD.